March 27, 1934.  R. G. JEWELL  1,952,921
SOFT IRON MEASURING INSTRUMENT
Filed Sept. 27, 1932
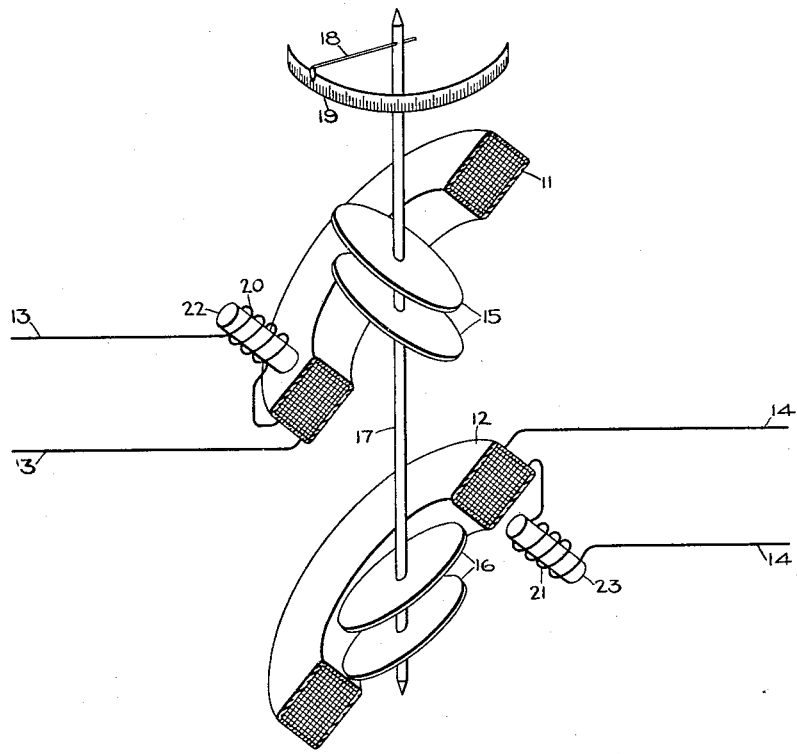
Inventor:
Richard G. Jewell,
by Charles V. Mullen
His Attorney.

Patented Mar. 27, 1934

1,952,921

UNITED STATES PATENT OFFICE 1,952,921

SOFT IRON MEASURING INSTRUMENT

Richard G. Jewell, Lynn, Mass., assignor to General Electric Company, a corporation of New York Application September 27, 1932, Serial No. 635,039

7 Claims. (Cl. 171—95)

My invention relates to current-responsive instruments and concerns particularly means for compensating instruments affected by saturation.

In various types of electrical instruments including iron or other saturable magnetic material in the magnetic path, the degree of saturation varies with the strength of the measured magnetizing current and consequently the magnetization as well as the torque produced by the instrument does not bear the same relationship to the current for small values of current as for larger values. In the case of simple current measuring instruments or devices responsive to absolute values of current, the fact that the current torque characteristic varies with strength of current may not always be undesirable since the instrument may be calibrated at a suitable number of points, thereby making it immaterial from the standpoint of accuracy what the shape of the current torque curve is. In the case of instruments which do not depend upon the absolute value of current alone for their operation, however, such as ratio instruments, for example, it is not only desirable but necessary that the current torque characteristics of any given scale position remain the same regardless of the absolute value of current.

It is an object of my invention to provide current-responsive devices having means for compensating for the effect of saturation in weakening the torque at certain current values and it is especially an object of my invention to provide a compensating arrangement which is suitable for use with ratio instruments having opposing units of the soft iron instrument type. Other and further objects and advantages of my invention will be apparent as the description proceeds.

In accordance with my invention, in its preferred form, I provide an instrument of the soft iron type with a compensating coil which is attached to the field coil of the instrument and which has its axis eccentric to that of the field coil. The compensating coil is preferably provided with a saturable core. Without compensating means, as a result of saturation of the soft iron elements with increasing current values, the torque increases with current more rapidly at relatively small values of current than at larger values of current. This effect is compensated for in accordance with my invention by the fact that the compensating coil is arranged eccentrically to the main field coil and tends to distort the field produced by the field coil or to make the direction of the flux oblique to the axis of the field coil until the core of the compensating coil becomes saturated and its effect is diminished. In this manner the instrument torque is diminished for relatively small values of current since the torque produced by the magnetic field depends upon its direction as well as upon its strength, and the instrument torque is substantially unaffected for larger values of current. The features of my invention which I believe to be novel and patentable will be pointed out in the claims appended hereto.

For a more complete understanding of my invention, reference may be had to the following description taken in connection with the accompanying drawing.

Referring now more in detail to the drawing, in which I have illustrated the application of my invention to current-responsive units used to form a ratio instrument, I provide a pair of stationary field coils 11 and 12 connected in circuits 13 and 14, the currents in which are to be compared. Soft iron magnetic vanes 15 cooperating with coil 11, and similar vanes 16 cooperating with coil 12 are carried by a common shaft 17. Although the compensating means hereinafter described might be employed with other types of current-responsive instruments, I prefer to use current-responsive units of the inclined coil type in which the field coils 11 and 12 are inclined to the axis of the rotating shaft 17 and the magnetic vanes 15 and 16 are also inclined to the axis of the shaft 17. Although I have described my invention in connection with an indicating instrument having a pointer 18 carried by the shaft 17 and a scale 19 cooperating with the pointer 18, it will be understood that my invention is not limited to indicating instruments but obviously includes contact making, recording or other current-responsive instruments as well.

Each of the current-responsive units operates in a manner which is well known for inclined coil instruments. The magnetic field produced by the stationary coils tends to cause the magnetic vanes to align themselves in the direction of the magnetic flux. Owing to the fact that the axis of rotation is inclined both to the axis of the field coils and to the magnetic vanes, the reaction between the magnetic vanes and the field results in the rotation of the vanes 15 and 16 and the shaft 17. The relative angular positions of vanes 15 and 16 on shaft 17 are such that the fields produced by windings 11 and 12 tend to rotate the magnetic vanes 15 and 16 in opposite directions. Furthermore, since the two units have their vanes arranged oppositely the torque of one unit increases while that of the other decreases with rotation in a given direction. Consequently the shaft 17 is rotated in one direction or another until the two torques become balanced. The position of the pointer 18 then indicates the ratio of the currents in circuits 13 and 14 in a manner which is well known in connection with ratio instruments.

Obviously for a given ratio of currents being measured and consequently for a given scale position, the currents in the windings 11 and 12 may vary widely within the permissible operating range of the instrument. This fact tends to give rise to errors in uncompensated instruments, as will become apparent from the following explanation of the operation of the instrument without means for compensation. With relatively large values of current, the magnetic vanes 15 and 16 obviously tend to become saturated, the effect of which becomes greater with increasing values of current. But since the coils 11 and 12 ordinarily are not carrying the same value of current the effects of saturation will not ordinarily be the same in the two units. Likewise the effects of saturation on the torques of the units will be different so that the torques of the two units will not increase in equal proportion if the currents originally unequal are increased in equal proportion. The effect of saturation therefore is to cause the torques to become unequal thereby causing the shaft 17 to rotate in the one direction or another until a new torque balance is obtained whenever the absolute values of current vary while the current ratio remains constant. Consequently unless compensating means were employed it would be necessary to calibrate the instrument for absolute values of current as well as for ratios of current in order to obtain accurate measurements.

In order to make the operation of the instrument substantially independent of the absolute values of the current flowing through the windings, I provide compensating coils 20 and 21 preferably having magnetic cores 22 and 23. The coils 20 and 21 serve to diminish the torques of their associated current responsive units before saturation takes place by distorting the fields. To accomplish this they may be arranged in any suitable manner to change the angles of the fluxes through the field coils 11 and 12 or to weaken these fluxes unequally.

An arrangement which I have found satisfactory is to place the coils 20 and 21 at the sides of coils 11 and 12 and to make the connections such that the compensating coils have the same polarities as the corresponding field coils, i. e., the magnetic fields within the coils act in the same general directions. Since the compensating coils 20 and 21 are placed at the sides of coils 11 and 12 at some distance from their magnetic axes, the currents flowing in the compensating coils 20 and 21 tend to distort the fields produced by coils 11 and 12. The direction of the flux becomes oblique to the mechanical axis of the coils 11 and 12 and more nearly parallel with the axis of rotation of vanes 15 and 16, thereby reducing the turning moment for values of current insufficient to produce appreciable saturation. With increasing current, the effect of saturation of magnetic vanes 15 and 16 tends to weaken the torque relative to the strength of the current flowing, but the saturation of the cores 22 and 23 of the compensating coils 20 and 21 tends to diminish the weakening effect of the compensating coils so that both units have substantially the same current torque characteristic at any given scale position.

While I have described my invention in concrete form and as operating in a specific manner in accordance with the patent statutes, it is to be understood that I do not limit my invention thereto since various other modifications thereof will suggest themselves to those skilled in the art without departing from the spirit of my invention, the scope of which is set forth in the appended claims.

What I claim as new and desire to secure by Letters Patent of the United States, is:—

1. A ratio instrument comprising a pair of opposing units having a common shaft and each of which comprises a stationary current conducting field coil having an axis oblique to said shaft, a magnetic vane attached to said shaft at an angle thereto and a compensating coil connected in series with said field coil having a magnetic core mounted eccentrically with respect to said field coil with its axis substantially parallel to that of said field coil, the electrical constants of the instrument being so chosen that said compensating coils are weakened by saturation with increasing currents and the relative field distortion produced by said compensating coils is reduced, thereby compensating for the weakening effect of saturation on the torques on said opposing units.

2. A ratio instrument comprising a pair of stationary field coils carrying currents proportional to the quantities to be compared, mechanically connected movable magnetic vanes cooperating with each of said field coils, each mounted to rotate about an axis oblique to the axis of the field coil with which it cooperates and having a magnetic axis oblique to its axis of rotation, compensating coils placed eccentrically to said field coils and serving to cause the resultant fields produced by said coils to be oblique to their axes with values of current insufficient to cause saturation of said magnetic vanes, thereby weakening the torque produced at such values of current to compensate for the weakening caused by saturation at higher values of current, said field coils being so arranged as to act oppositely on said vanes so that the position assumed by the vanes depends upon the ratio of the quantities being compared.

3. A ratio instrument comprising a pair of opposing current responsive units, each comprising a pair of relatively rotatable cooperating elements in inductive relation and having axes oblique to the axis of rotation, and a pair of compensating coils, one of the elements of each of said units having one of said compensating coils eccentrically mounted with respect thereto and connected in circuit with the current to which the corresponding unit responds for the purpose of modifying the current-torque characteristic of both units so as to make them substantially the same at any given position of the rotatable elements, so that the calibration of the instrument will be substantially independent of the absolute values of currents, the electrical constants of said instrument being such that said compensating coils are sufficiently weakened by saturation with increasing currents to balance the effect of saturation on the corresponding current responsive units.

4. A ratio instrument comprising a pair of opposing current-responsive units, each including a current conductive field coil and a magnetic vane, one of which is movable with respect to the other, the movable element of one unit being mechanically connected to that of the other, a pair of compensating coils each mounted eccentrically with respect to one of said field coils and connected in circuit therewith for the purpose of distorting the magnetic fields produced by said coils with values of current insufficient to produce appreciable saturation, thereby weakening the torque produced with such values and compensating for the weakening of torque caused by saturation of said vanes with higher values of current.

5. A current-responsive instrument comprising a current conducting field coil and a magnetic vane, one of which is movable with respect to the other, and a compensating coil having a saturable core in circuit with said field coil and eccentrically mounted with respect thereto for the purpose of modifying the current-torque characteristic of said instrument, said compensating coil serving to distort the magnetic field produced by said field coil at relatively small values of current thereby diminishing the torque and compensating for the weakening in torque resulting from saturation in the magnetic vane at relatively larger values of current.

6. A current-responsive instrument comprising a current conducting field coil and a magnetic vane, one of which is rotatable with respect to the other, and each of which has its axis inclined to the axis of rotation, and a compensating coil having a saturable core in circuit with said field coil and eccentrically mounted with respect thereto for the purpose of modifying the current-torque characteristic of said instrument, said compensating coil serving to cause the direction of the magnetic field to be inclined to the axis of the field coil at relatively small values of current thereby diminishing the torque and compensating for the weakening in torque resulting from saturation of the magnetic vane at relatively larger values of current.

7. A current responsive instrument comprising a pair of relatively rotatable cooperating elements in inductive relation, one of which produces a magnetic field, and a compensating coil in circuit with the current to be measured having a saturable core and eccentrically mounted with respect to said field producing element, said compensating coil serving to distort said magnetic field at values of current insufficient to saturate said core and having relatively less effect at larger values of current, thereby modifying the current torque characteristic of said instrument.

RICHARD G. JEWELL.